US008438560B2

(12) United States Patent
Govindarajan et al.

(10) Patent No.: US 8,438,560 B2
(45) Date of Patent: May 7, 2013

(54) RESOURCE ASSESSMENT METHOD AND SYSTEM

(75) Inventors: Narayanan Govindarajan, Karnataka (IN); Prashant Baktha Kumara Dhas, Ithaca, NY (US); Madhvesh Navkal Badri, Tempe, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1601 days.

(21) Appl. No.: 11/874,440

(22) Filed: Oct. 18, 2007

(65) Prior Publication Data
US 2008/0109783 A1 May 8, 2008

(30) Foreign Application Priority Data

Nov. 7, 2006 (IN) .......................... 2052/CHE/2006

(51) Int. Cl.
*G06F 9/45* (2006.01)
(52) U.S. Cl.
USPC .......................... 717/176; 717/168; 717/177
(58) Field of Classification Search .................. None
See application file for complete search history.

(56) References Cited

U.S. PATENT DOCUMENTS

| | | | | | |
|---|---|---|---|---|---|
| 5,581,764 | A | * | 12/1996 | Fitzgerald et al. | 709/223 |
| 5,805,897 | A | * | 9/1998 | Glowny | 717/178 |
| 6,009,525 | A | * | 12/1999 | Horstmann | 717/177 |
| 6,117,188 | A | * | 9/2000 | Aronberg et al. | 717/176 |
| 6,123,737 | A | * | 9/2000 | Sadowsky | 717/173 |
| 6,138,153 | A | * | 10/2000 | Collins et al. | 717/177 |
| 6,381,742 | B2 | * | 4/2002 | Forbes et al. | 717/176 |
| 6,684,397 | B1 | * | 1/2004 | Byer et al. | 717/174 |
| 2001/0032259 | A1 | * | 10/2001 | Herrmann et al. | 709/224 |
| 2002/0026506 | A1 | * | 2/2002 | Herrmann et al. | 709/223 |
| 2002/0062334 | A1 | * | 5/2002 | Chen et al. | 709/200 |
| 2002/0087734 | A1 | * | 7/2002 | Marshall et al. | 709/310 |
| 2002/0100036 | A1 | * | 7/2002 | Moshir et al. | 717/168 |
| 2002/0147974 | A1 | * | 10/2002 | Wookey | 717/176 |
| 2002/0156874 | A1 | * | 10/2002 | Suorsa et al. | 709/220 |
| 2002/0174421 | A1 | * | 11/2002 | Zhao et al. | 717/174 |
| 2003/0051236 | A1 | * | 3/2003 | Pace et al. | 717/177 |
| 2003/0095141 | A1 | * | 5/2003 | Shah et al. | 345/735 |
| 2003/0204532 | A1 | * | 10/2003 | Maslowski | 707/200 |
| 2003/0212990 | A1 | * | 11/2003 | Brodkorb et al. | 717/174 |

(Continued)

OTHER PUBLICATIONS

"How to determine if hardware or software is compatible with Windows XP", Microsoft, Jan. 2002, <http://support.microsoft.com/kb/295322> pp. 1-2.*

(Continued)

*Primary Examiner* — Thuy Dao
*Assistant Examiner* — Samuel Hayim

(57) ABSTRACT

A resource assessment method and system. The method comprises identifying at least one information technology resource, providing characteristics of the information technology resource, maintaining a database of characteristics of at least one software product, generating a data collector software tool based on the characteristics of the information technology resource and the characteristics of the software product, composing a resource assessment agent that includes the data collector software tool, adapted for installation on the information technology resource to collect data pertaining to the information technology resource, to perform an analysis of the data by reference to the characteristics of the software product and to return at least one result of the analysis, deploying the resource assessment agent on the information technology resource, receiving the result of the analysis from the information technology resource, and outputting the result of the analysis.

11 Claims, 4 Drawing Sheets

U.S. PATENT DOCUMENTS

| | | | |
|---|---|---|---|
| 2004/0003266 A1* | 1/2004 | Moshir et al. | 717/168 |
| 2004/0015940 A1* | 1/2004 | Heisey et al. | 717/168 |
| 2004/0088397 A1* | 5/2004 | Becker et al. | 709/223 |
| 2004/0143830 A1* | 7/2004 | Gupton et al. | 717/174 |
| 2004/0226010 A1* | 11/2004 | Suorsa | 717/176 |
| 2004/0255291 A1* | 12/2004 | Sierer et al. | 717/174 |
| 2005/0102383 A1* | 5/2005 | Sutler | 709/223 |
| 2005/0204354 A1* | 9/2005 | Sundararajan et al. | 717/174 |
| 2005/0273758 A1* | 12/2005 | Long | 717/101 |
| 2006/0031827 A1* | 2/2006 | Barfield et al. | 717/168 |
| 2006/0041883 A1* | 2/2006 | Chambers et al. | 717/174 |
| 2006/0161879 A1* | 7/2006 | Lubrecht et al. | 717/101 |

OTHER PUBLICATIONS

Giancarlo Succi et al., "Understanding the Dynamics of Software Compatibility", IEEE, Apr. 2000, <http://ieeexplore.ieee.org/stamp/stamp.jsp?tp=&arnumber=839376> pp. 1-3.*

Il-Chul Yoon et al., "Direct-Dependency-based Software Compatibility Testing", ACM, 2007, <http://delivery.acm.org/10.1145/1330000/1321696/p409-yoon.pdf> pp. 1-4.*

* cited by examiner

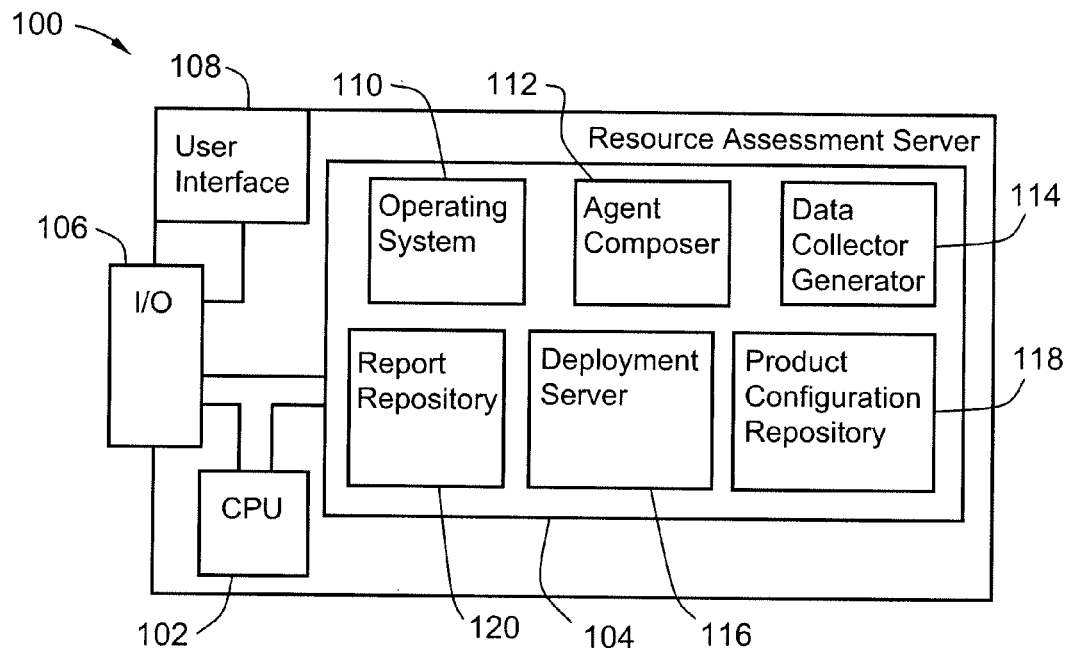
Figure 1
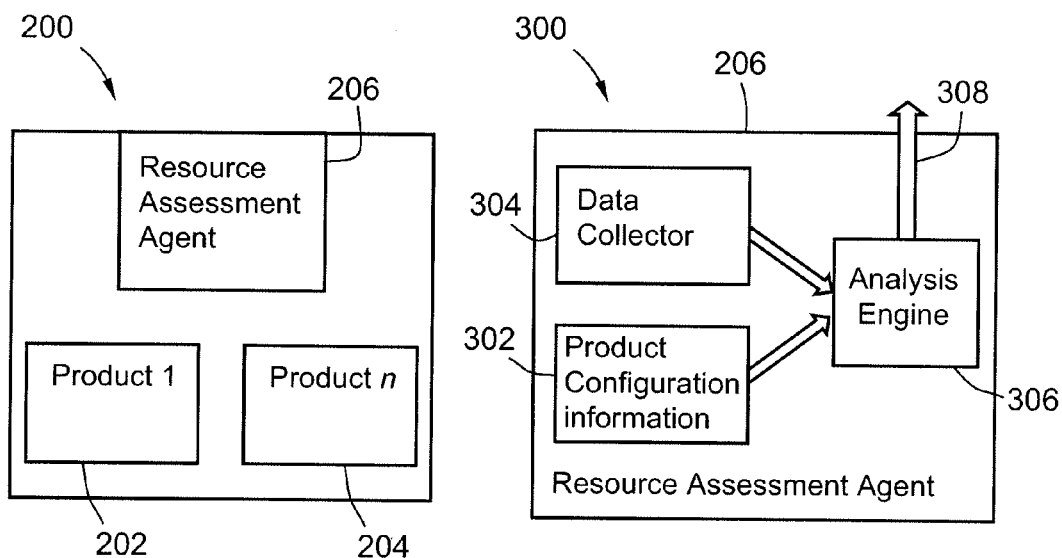
Figure 2 · Figure 3

RESOURCE ASSESSMENT METHOD AND SYSTEM

This application claims priority from Indian patent application 2052/CHE/2006, filed on Nov. 7, 2006. The entire content of the aforementioned application is incorporated herein by reference.

BACKGROUND OF THE INVENTION

Information technology (IT) administrators in many organizations are frequently required to respond promptly to changes in IT infrastructure requirements, as those changes arise. Unfortunately, it is not uncommon that, during the installation of a software product on an IT resource (such as a server, a personal computer, a personal digital assistant, a mobile telephone, a computing peripheral or any other device on which software products can be installed), it is found that the IT resource has insufficient capacity or an unsuitable configuration for the software to be installed. In such cases, if an update to a resource is required or an alternative resource must be procured, a delay occurs between receiving the software (such as from its vendor) and installing the software. For the deployment of distributed software, such as involving a combination of products in a heterogeneous environment such as a Grid (i.e. a networked collection of IT resources configured for coordinated resource sharing), this would mean multiplied cost as a heterogeneous pool of resources is involved.

One existing approach involves providing an installation guide detailing system requirements for a product installation. The system administrator manually ensures that all the requirements are met by the resource. Another existing approach uses a software product's installer to analyze—during installation—the resource and provide details of any shortcoming of the resource that prevent successful installation.

Another existing approach involves a system administrator's contacting the vendor's support desk for assistance. This can also introduce delay and expense into the installation process.

BRIEF DESCRIPTION OF THE DRAWING

In order that the invention may be more clearly ascertained, embodiments will now be described, by way of example, with reference to the accompanying drawing, in which:

FIG. 1 is a schematic view of a resource assessment server according to an embodiment of the present invention.

FIG. 2 is a schematic view of a typical information technology resource, whose requirements for software installation are assessed by the resource assessment server of FIG. 1.

FIG. 3 is a schematic view of a resource assessment agent according to an embodiment of the present invention.

DETAILED DESCRIPTION OF THE EMBODIMENTS

Figure 4A:
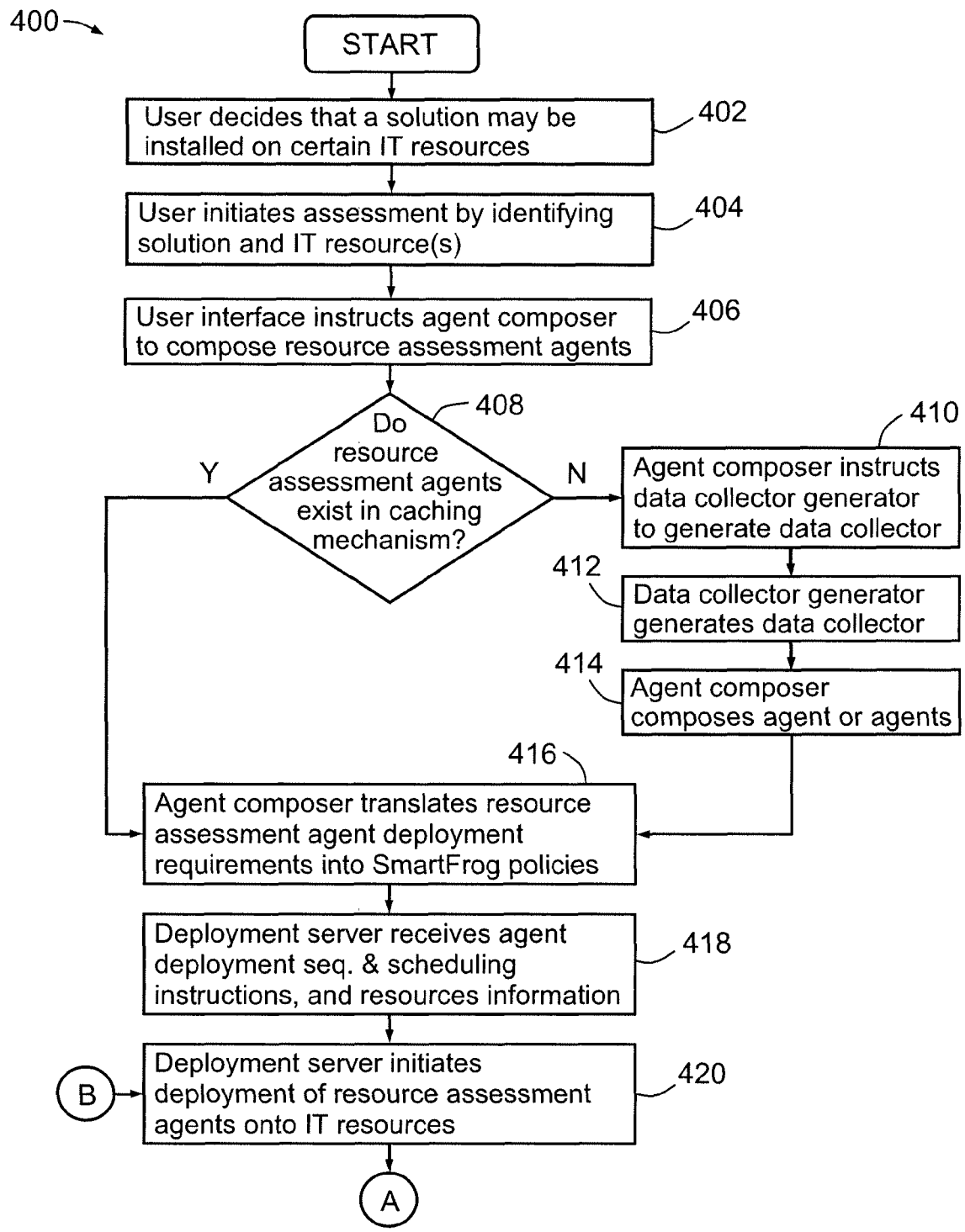
FIG. 4 is a flow diagram of a method of resource assessment according to an embodiment of the present invention, and employed by the resource assessment server of FIG. 1.

There will be described a resource assessment method and system. In one embodiment, there is provided a resource assessment method comprising identifying at least one information technology resource, providing characteristics of said information technology resource, maintaining a database of characteristics of at least one software product, generating a data collector software tool based on the characteristics of the information technology resource and the characteristics of the software product, composing a resource assessment agent that includes the data collector software tool, adapted for installation on the information technology resource to collect data pertaining to the information technology resource, to perform an analysis of the data by reference to the characteristics of the software product and to return at least one result of the analysis, deploying the resource assessment agent on the information technology resource, receiving the result of the analysis from the information technology resource; and outputting the result of the analysis.

There will also be described a resource assessment software agent for assessing the suitability of an information technology resource for having a software product installed thereon.

A system in the form of a resource assessment server according to an embodiment of the present invention is shown schematically at 100 in FIG. 1. Server 100 includes a processor 102, memory 104, an I/O device 106, and a user interface 108. Memory 104 (which comprises RAM, ROM and at least one hard-disk drive) includes an operating system 110, an agent composer 112, a data collector generator 114, a deployment server 116 a product configuration repository 118 and a report repository 120.

The server 100 operates according to an agent-server model in cooperation with resource assessment agents (described below by reference to FIG. 3) installed in individual resources (such as user computers, see FIG. 2). The installation and configuration of a software product in diverse and heterogeneous resources, or of a combination of software products in heterogeneous resources, is—according to this embodiment—defined with user interface 108 in terms of a solution profile. All the resources to be analyzed for a solution profile are described using the user interface 108. The resources are assessed for readiness using the resource assessment agents. The resource assessment agents report back to the server 100 on the resources' statuses. The resource assessment agents are adapted according to the information that must be checked on each particular resource, to find out whether the resource is ready for a product or combination of products. The reports of the resource assessment for a particular solution profile can be viewed again using the user interface 108.

The deployment server 116 is in the form of a HP SmartFrog server. SmartFrog is a flexible framework for the construction of configuration-driven systems. It provides a language for describing system configurations and a component model defining the interfaces that components provide to implement the component lifecycle. Further, it has a deployment system for parsing the descriptions and managing the running systems through their lifecycles. The SmartFrog reference manual (downloadable from www.smartfrog.org) is incorporated herein by reference.

User interface 108 is a web based user interface and can be used to describe a solution profile. In general, a solution profile is created by a user with user interface 108, by providing resource information, such as resource IP address or name, resource access details (including authentication information) and the product or combination of products for which the status of the resource needs to be analyzed. The solution profile can describe: i) a particular product to be installed on multiple IT resources; ii) a combination of different products to be installed on a single IT resource; or iii) a combination of different products to be installed on different IT resources. In this embodiment, the solution profile characterizes a Grid of IT resources on which a distributed solution (comprising a combination of software products) is to be installed, and identifies the proposed solution. The user also enters into the profile the characteristics of the IT resources (though optionally resource assessment server 100 may have a database of such characteristics so that the user need merely identify the IT resources). However, a solution profile can be defined for any number of resources and any type of resource that deployment server 116 supports.

Product configuration repository 118 is a repository of XML based product baseline requirements for different platforms. For example, for a Product A, for platform X, the information regarding operating system (OS) patches, patches for dependent products, system memory information, swap space, command execution outputs, etc. are defined in a requirement XML document. Product configuration repository 118 is periodically upgraded (as required) with new product configuration information or updated information using a secure HTTPS connection to a Requirement Portal (not shown) containing a master configuration repository for all the software products of each product's vendor; the Requirement Portal is located on the vendor's backend server, and is kept updated with product documentation. The upgrade of product configuration repository 118 replaces existing or adds newer XML documents to the repository 118. Product configuration repository 118 can be upgraded with more product requirement information in XML format, provided that the information is available in a suitable schema.

Data collector generator 114 generates a system data collector binary based on each resource's platform/OS and the software products (and their requirements) that are to be installed. Data collector generator 114 produces the binary by assembling standard constructs for different platforms that it maintains according to product requirements identified in product configuration repository 118. Data collector generator 114 can optionally include a cache mechanism where data collectors for particular product and platforms can be generated once and subsequently used from the cache.

Agent composer 112 has a caching mechanism (not shown) for the resource assessment agents so that, if a resource assessment agent for a particular resource type with a software combination is already available, it will re-use that agent. In the absence of an agent in the cache, agent composer 112 composes an agent consisting of system data collector, analysis engine and product configuration information. Agent composer 112 also initiates the deployment server 116 by translating the resource assessment agent deployment requirements into SmartFrog policies for those IT resources.

Deployment server 116 is configured to receive agent deployment sequence and scheduling instructions, and the resources information, from the agent composer 112 and deploys the resource assessment agents onto the appropriate IT resources. Once the resource assessment agents complete the resource analysis, the agents are uninstalled by deployment server 116.

FIG. 2 is a schematic view of a typical IT resource 200, whose requirements for software installation are assessed by server 100. IT resource 200 will typically already have several software products 202,204 installed. In addition, IT resource 200 includes a resource assessment agent 206, previously installed by server 100.

FIG. 3 is a schematic view 300 of a resource assessment agent 206 according to this embodiment. Resource assessment agent 206 includes product configuration information 302, obtained from the product configuration repository 118, a system data collector 304 for the platform that was generated based on the requirements, and an analysis engine 306. System data collector 304 collects the system information. This information is analyzed by the analysis engine 306 in relation to the product configuration information 302. The results of the analysis are sent 308 securely to report repository 120 on the resource assessment server 100 over HTTPS.

Report repository 120 thus contains the reports for solution profiles as generated by the resource assessment agents 206. An assessment summary for a particular solution profile can be viewed with user interface 108. This information can also be archived, if appropriate.

Figure 4B:
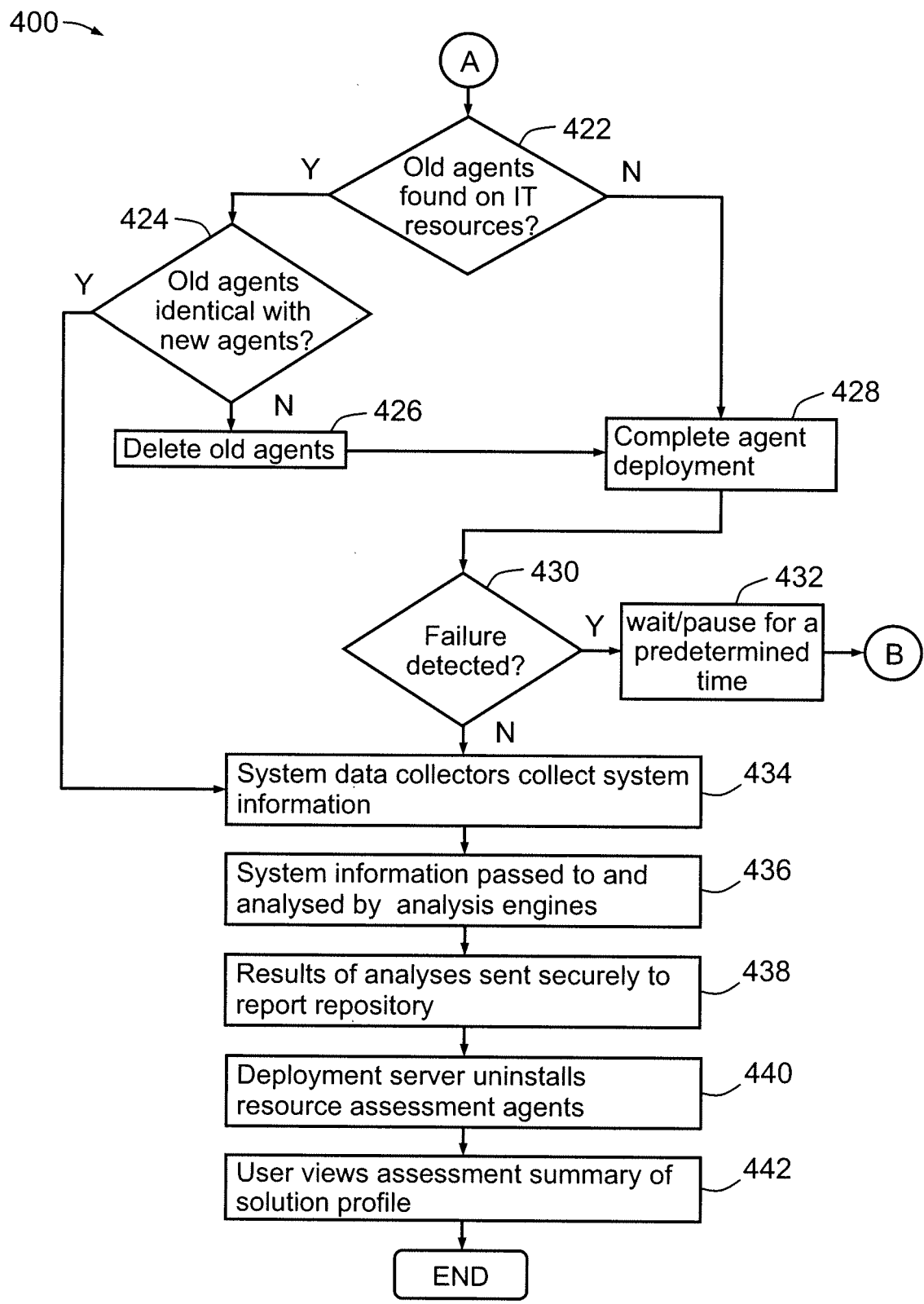

FIG. 4 is a flow diagram of the method 400 by which server 100 operates according to this embodiment. Thus, at step 402 a user decides that a software solution may be installed on one or more IT resources 200 (which may be in or constitute a Grid), and hence that an assessment of whether this is possible must be made. At step 404, the user employs user interface 108 to control server 100 to initiate that assessment, including identifying the software solution and the IT resources 200 on which the software solution is to be installed.

Using user interface 108, the user starts the assessment process by, at step 406, invoking agent composer 112 with the system profile information to compose resource assessment agents 206 suitable for deploying on the identified IT resources 200, and hence to facilitate an assessment of those IT resources 200. At step 408, agent composer 112 determines whether suitable resource assessment agents 206 already exist in the caching mechanism of agent composer 112. If not, processing continues at 410, where agent composer 112 instructs data collector generator 114 to generate a suitable data collector 304. At step 412, data collector generator 114 generates the data collector 304 on the basis of information concerning the software to be installed, its requirements and the IT resources 200 on which the software is to be installed, obtained from product configuration repository 118. At step 414, upon receipt of the data collector 304, agent composer 112 composes the necessary resource assessment agent or agents 206. Processing then continues at step 416.

If, at step 408, agent composer 112 does identify a suitable resource assessment agent or agents in its caching mechanism, processing also continues at step 416. Thus, at step 416, agent composer 112 initiates the deployment server 116 by translating the resource assessment agent deployment requirements into SmartFrog policies for their respective IT resources 200 (in the form of agent deployment sequence and scheduling instructions).

At step 418, deployment server 116 receives the agent deployment sequence and scheduling instructions and the resources information from agent composer 112 and, at step 420, deployment server 116 initiates deployment of the resource assessment agents 206 onto the respective IT resources 200. At step 422, deployment server 116 determines whether any old agents (from a previous resource assessment or attempted resource assessment) are already on the IT resources 200. If so, at step 424 deployment server 116 checks whether the old agents are identical with the (new) resource assessment agents 206. If the old and new agents are identical, deployment can be regarded as complete without the actual installation of the new agents (the installation of the old agents constituting an acceptable agent deployment) and processing continues at step 434, but if the old and new agents are not identical processing continues at step 426 where the old agents are deleted and processing passes to step 428. At step 428 agent deployment is completed, that is, deployment server 116 deploys the (new) resource assessment agents 206. At step 430, resource assessment server 100 determines whether a failure has been detected in the deployment of the resource assessment agents 206. If a failure has been detected, at step 432 resource assessment server 100 waits/pauses (for a predetermined time), then returns to step 420 so that deployment server 116 can repeat the initiation of the deployment of the resource assessment agents 206 onto the respective IT resources 200). If, at step 430, a failure has not been detected, processing continues at step 434.

At step 434, the system data collector 304 of each resource assessment agent 206 collects the system information from the respective IT resource. At step 436, this system information is passed to and analyzed by the analysis engine 306 in relation to the product configuration information 302 of each resource assessment agent 206. At step 438, the results of these analyses are sent to report repository 120 on the resource assessment server 100, securely over HTTPS. At step 440 the resource assessment agents are uninstalled by deployment server 116.

At step 442, the user outputs any of the solution profiles stored in report repository 120. This is typically done by viewing an assessment summary of a particular solution profile on user interface 108.

It will be noted that method 400 traps a number of events, including the failure of a successful deployment of the resource assessment agents 206. Most other failures, should they occur during the execution of method 400, simply prompt the termination of the method and the reporting of the failure to or by server 100. The user can then attempt to execute method 400 again, such as manually from the user interface 108, at some later time (typically having addressed the reason or reasons for the failure).

Figure 5:
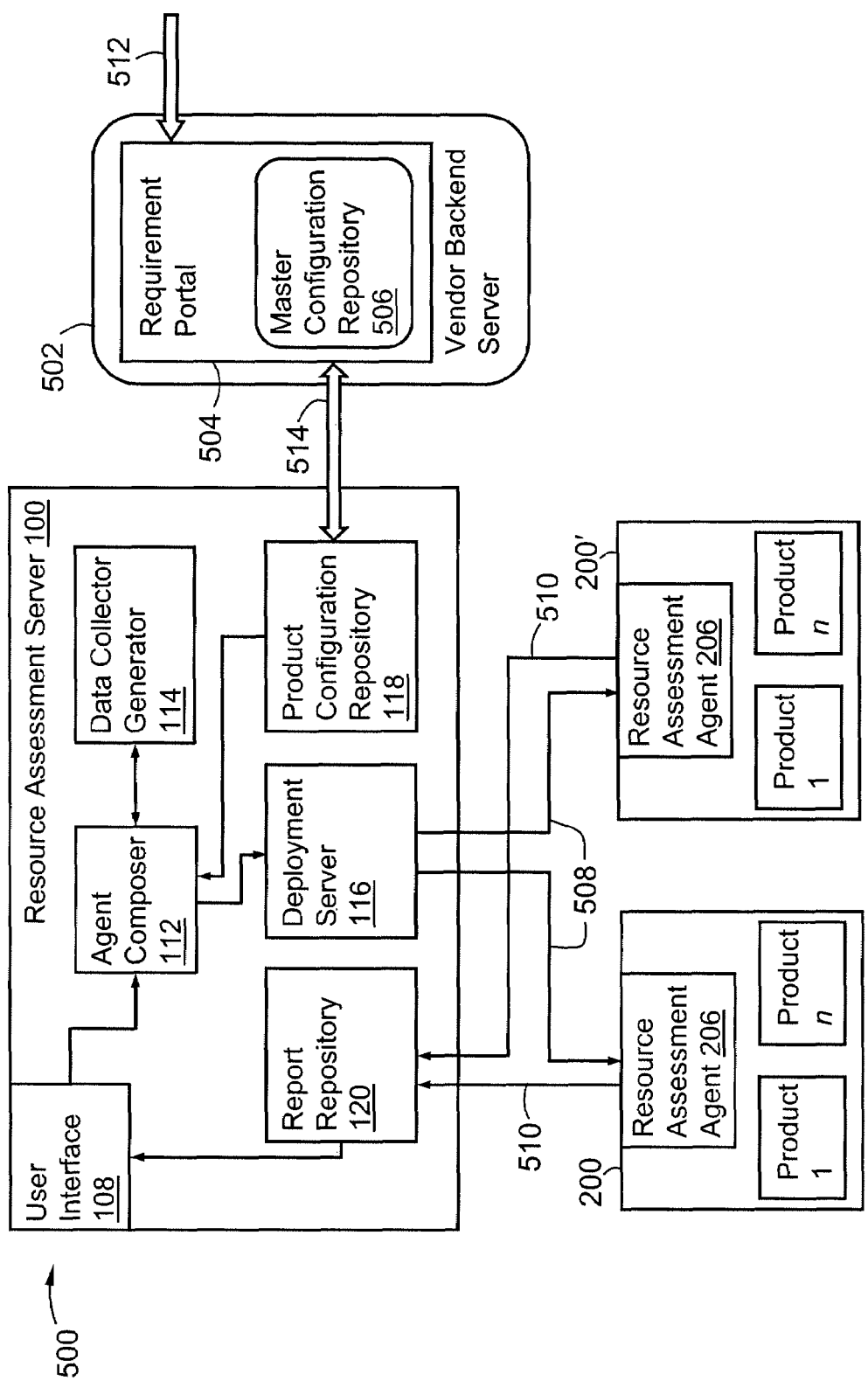
FIG. 5 is a schematic view of a computing environment in which the method of resource assessment of FIG. 4 is conducted.

FIG. 5 is a schematic view of a computing environment 500 in which method 400 is conducted. Computing environment 500 includes, represented for clarity in simplified form, resource assessment server 100, a first IT resource 200, a second IT resource 200' and a software vendor backend server 502 (discussed above) for upgrading product configuration repository 118. Vendor backend server 502 includes a Requirement Portal 504 that has a master configuration repository 506 that is periodically updated with software product documentation.

FIG. 5 also depicts the principal data flows discussed above, including the deployment 508 of resource assessment agents 206 onto the targeted IT resources, the forwarding 510 of the resources analysis reports over HTTPS to the report repository 120, the inputting 512 of software product documentation to Requirement Portal 504, and the transfer 514 over HTTPS of configuration information to upgrade product configuration repository 118.

In some embodiments the necessary software for controlling server 100 of FIG. 1 to perform the method 400 of FIG. 4 is provided on a data storage medium. It will be understood that, in this embodiment, the particular type of data storage medium may be selected according to need or other requirements. For example, instead of a CD-ROM the data storage medium could be in the form of a magnetic medium, but any data storage medium will suffice.

The foregoing description of the exemplary embodiments is provided to enable any person skilled in the art to make or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

The invention claimed is:

1. A computer implemented resource assessment method, comprising:
   providing characteristics of an information technology resource;
   accessing characteristics of at least one software product from a database;
   generating a data collector software tool with a data collector generator based on said characteristics of said information technology resource and said characteristics of said at least one software product;
   an agent composer software tool determining whether suitable resource assessment agents already exist and in response to no suitable resource assessment agents existing, composing a resource assessment agent that includes said data collector software tool, adapted for installation on said information technology resource to collect data pertaining to system information relating to said information technology resource, to perform an analysis of said data by reference to said characteristics of said at least one software product to determine a compatibility of said information technology resource with said at least one software product and to return at least one result of said analysis;
   deploying said resource assessment agent on said information technology resource with a deployment server software tool, wherein the resource assessment agent includes a system data collector, analysis engine, and product configuration information of the at least one software product; and
   receiving and outputting said result of said analysis from said information technology resource with a computing device.

2. A method as claimed in claim 1, wherein the method further includes:
   determining with the deployment server software tool whether a previous resource assessment agent is located on the information technology resource;
   in response to a previous resource assessment agent being located on the information technology resource, determining with the deployment server software tool if the previous resource assessment agent is identical to the resource assessment agent composed by the agent composer software tool; and
   in response to the previous resource assessment agent and the resource assessment agent composed by the agent composer software tool being identical, indicating deployment is complete.

3. A method as claimed in claim 1, including providing said resource assessment agent with the analysis engine for performing said analysis on the information technology resource.

4. A method as claimed in claim 1, including generating said data collector software tool with a data collector generator, composing the resource assessment agent with an agent composer software tool, deploying said resource assessment agent on said information technology resource with a deployment server software tool, and providing said database of characteristics of the at least one software product, said at least one analysis result, said data collector generator, said agent composer software tool and said deployment server software tool in a computing device or system.

5. A method as claimed in claim 1, wherein said database includes characteristics of a plurality of software products and said method includes selecting said at least one software product from said plurality of software products.

6. A method as claimed in claim 1, including maintaining a further database of characteristics of one or more information technology resources.

7. A resource assessment computing system having a processor, comprising:
- an input on a computing device for receiving data identifying an information technology resource;
- a data collector generator adapted to generate a data collector software tool based on characteristics of said information technology resource and characteristics of at least one software product accessed from a database;
- agent composer software tool adapted to first determine if a suitable resource assessment agent exists and in response to no suitable resource assessment agents existing adapted to second compose a resource assessment agent that includes said data collector software tool, adapted for installation on said information technology resource to collect data pertaining to system information relating to said information technology resource, to perform an analysis of said data by reference to said characteristics of said at least one software product to determine a compatibility of said information technology resource with said at least one software product and to return at least one result of said analysis;
- a deployment server software tool adapted to deploy said resource assessment agent on said information technology resource, wherein the resource assessment agent includes a system data collector, analysis engine, and product configuration information of the at least one software product;
- and an output on the computing device;
- wherein said system is adapted to receive said result of said analysis from said information technology resource and is controllable to output said result of said analysis with said output.

8. A system as claimed in claim 7, adapted to provide said resource assessment agent with the analysis engine for performing said analysis on the information technology resource.

9. A system as claimed in claim 7, wherein said database includes characteristics of a plurality of software products.

10. A system as claimed in claim 7, wherein the data collector generator is adapted to access a further database including characteristics of one or more information technology resources.

11. A non-transitory computer readable medium provided with program data that, when executed on a computing device or system, controls the device or system to perform the method of claim 1.

\* \* \* \* \*

UNITED STATES PATENT AND TRADEMARK OFFICE
CERTIFICATE OF CORRECTION

PATENT NO. : 8,438,560 B2
APPLICATION NO. : 11/874440
DATED : May 7, 2013
INVENTOR(S) : Narayanan Govindarajan et al.

Page 1 of 1

It is certified that error appears in the above-identified patent and that said Letters Patent is hereby corrected as shown below:

In the Claims

In column 7, line 18, in Claim 7, delete "agent" and insert -- an agent --, therefor.

Signed and Sealed this
Twenty-ninth Day of October, 2013

Teresa Stanek Rea
*Deputy Director of the United States Patent and Trademark Office*